United States Patent Office 2,888,423
Patented May 26, 1959

2,888,423

COMPOSITION COMPRISING CHLOROSUBSTI-TUTED ETHYLENE POLYMER PLASTICIZED WITH 1,4-DIAROYL BUTANE

Ronald B. Spacht, Kent, and Coy Edward Sturm, Akron, Ohio, assignors to The Goodyear Tire & Rubber Company, Akron, Ohio, a corporation of Ohio No Drawing. Application March 31, 1954
Serial No. 420,196

9 Claims. (Cl. 260—32.8)

This invention relates to a method of compounding vinyl resins and to the resultant compositions and to a method for making shaped articles therefrom. More particularly, the invention relates to compositions of vinyl resins which have the properties of being plasticized at the usual milling and molding temperatures, and when cooled to ordinary temperatures retain these properties for a considerable length of time, but eventually undergo a metamorphosis, changing into tough, rigid, hard, nonextensible compositions that have all the appearance of an unplasticized resin and indicate only a small amount of plasticization. On being heated the compositions again become plastic and flexible, and, upon cooling to ordinary temperatures, again go through the cycle indicated above.

The invention thus provides a new method for the fabrication of hard, rigid, solid articles from vinyl resins. The compositions of the invention may be readily worked on a two-roll mill while in the fused state. On removal from the mill the compositions retain flexibility for some time and may be bent or shaped while cool and then set to a hard rigid state, when they retain their shaped condition. This property is particularly advantageous in such applications as the fabrication of tubing or pipe. According to prior practices, it is necessary to bend or shape the tubing while hot, whereas by using the compositions of this invention the tubing can be shaped or bent while cold and then set to a hard rigid condition on standing at ordinary temperature, after which it exhibits the properties of an essentially unplasticized resin.

It is an object of this invention to provide compositions of vinyl resins which become fused and flexible on heating, and which, when cooled to ordinary temperature, retain flexibility for a considerable period of time, but gradually change to tough, hard, nonextensible, seemingly unplasticized resins. It is another object of this invention to provide vinyl resin compositions which possess the property of delayed hardening at room temperature. Another object is to provide vinyl resin compositions which may be shaped and formed at ordinary temperatures and, on standing at such ordinary temperatures, set to hard, rigid, seemingly unplasticized compositions. Further objects will appear hereinafter as the description of this invention proceeds.

Vinyl resins, particularly polyvinyl chloride and the copolymer resins formed by the conjoint polymerization of vinyl chloride or vinylidene chloride with at least one other monomer copolymerizable therewith, are normally rigid, hard, and brittle in their unplasticized state. The unplasticized resins frequently cannot be processed by milling, extruding, or molding.

The above-described resins may be mixed with plasticizing compounds such as dioctyl phthalate, dibutyl sebacate, trioctyl phosphate and tricresyl phosphate. These plasticized compositions are readily worked on roll mills and products made therefrom are permanently flexible, or rubbery, and extensible. These vinyl resins can also be plasticized by intimately mixing therewith at elevated temperatures certain compounds that, when mixed with the resin, form compositions that are thoroughly plasticized at elevated temperatures but which, when cooled to room temperature, quickly form hard, rigid compositions which show an insignificant amount of plasticization at ordinary temperatures.

Thus, according to known practices, vinyl resin compositions of two types can be obtained. One type consists of a vinyl resin plasticized with a material which gives a flexible, more or less rubbery composition. It never sets to a hard rigid state at ordinary temperatures, and is chiefly useful in products requiring flexible, extensible properties. The other type previously known consists of a vinyl resin mixed with a material that acts as a plasticizer while the composition is hot, and sets immediately on cooling so that the whole mass quickly becomes hard and rigid and remains so. Compositions of this kind are useful in applications where it is necessary for the product to quickly set on cooling, and have been proposed for use in injection molding applications.

While this quick-setting property is advantageous for some uses it has certain inherent disadvantages that make it undesirable for many applications. Once the composition has cooled it can no longer be shaped because it has set to a rigid condition. If it is desired to shape the material it must be done while the composition is hot. The disadvantages of this are obvious since it is not always convenient or practical to shape an article which is in a heated condition. In addition, it is at times difficult to keep a stock in a hot condition until it can be formed into a certain shape. Particularly is this true when the articles is large or if it has an elongated shape, as, for example, a pipe or tube.

Now, by the use of this invention these difficulties can be overcome. The compositions of this invention can be cooled and then shaped or they can be shaped while hot and then cooled. The compositions on standing in the cooled state set to a hard rigid condition. If it is desired to reshape them, they may be heated, cooled, and then reshaped while in the cool condition.

According to the present invention, we have discovered that when a vinyl resin and a compound of the general formula

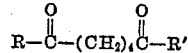

in which R and R' are the same or different members of the group consisting of phenyl, phenoxy, orthotolyl, metatolyl, paratolyl, orthotolyloxy, metatolyloxy and paratolyloxy radicals are blended together at an elevated temperature, the composition fuses and becomes viscous and readily workable. When the composition is cooled to room temperature it retains its flexibility for a considerable length of time and only slowly changes to a hard, rigid, seemingly unplasticized material. Thus a composition comprising, for example, 100 parts by weight of a vinyl resin and 50 parts by weight of 1,4-dibenzoyl butane may be worked smoothly and easily on a two-roll mill while in a fused state. Upon removing the sheet from the roll mill and cooling it to room temperature it retains its flexibility for some time and gradually changes to a white, stiff, very tough nonextensible sheet which shows little evidence of being plasticized.

The degree of flexibility and the hardness of the composition, as first obtained, can be regulated by varying the amount of the 1,4-dibenzoyl butane plasticizer added to the resin. For example, when only 10 parts of the plasticizer are added the composition is relatively hard and stiff, though not so hard or stiff as the resin to which no plasticizer has been added. Twenty-five parts of plasticizer make the resin considerably softer, and 50 parts make the resin quite soft and flexible as indicated above. These compositions, on standing at room temperature for a period of time, go through the hardening phase and change into tough, hard, rigid compositions that have all the appearance of an unplasticized resin. Similar effects may be obtained by the use of 1,4-di-(orthomethyl benzoyl) butane, 1,4-di(metamethyl benzoyl)betane, 1,4-di(paramethyl benzoyl)butane, diphenyl adipate, diorthotolyl adipate, dimetatolyl adipate and diparatolyl adipate.

The invention has been illustrated with respect to compounds containing 10, 25 and 50 parts by weight of the delayed-setting plasticizer per 100 parts by weight of resin, but it is to be understood that more or less than this may be used depending on the flexibility and softness desired in the stock as it is originally obtained and when cooled to room temperature. Thus, from 5 to 60 parts by weight or more of the dibenzoyl butane, and preferably from 10 to 50 parts by weight, for each 100 parts by weight of resin may be used.

This invention is particularly applicable to the vinyl resins obtained as products of the polymerization or copolymerization of an alpha chloro substituted ethylene having from one to two chloro substituents on the alpha carbon atom, i.e., corresponding to the formula $$CH_2=CXCl$$

where X is H or Cl, the said products containing from 28.3 to 70.7% of combined chlorine in the polymer molecule. The products of polymerization include polyvinylchloride and copolymers of vinyl chloride with at least one other monomer copolymerizable therewith, and copolymers of vinylidene chloride with at least one other monomer copolymerizable therewith. The comonomer may be present in amount up to 50% of the total weight of the resin but preferably 5% to 15% is used. Examples of these resins are the copolymers of vinyl chloride with vinyl esters such as vinyl acetate, vinyl propionate, and vinyl butyrate; copolymers of vinyl chloride with esters of alpha, beta-unsaturated dicarboxylic acids such as diethyl fumarate, diethyl maleate, dibutyl fumarate, dibutyl maleate, diethyl itaconate, and dibutyl itaconate; copolymers of vinyl chloride with acrylic esters, such as methyl acrylate, ethyl acrylate, butyl acrylate, and ethyl chloroacrylate; copolymers of vinyl chloride with methyl methacrylate; copolymers of vinyl chloride and acrylonitrile; and copolymers of vinyl chloride with vinylidene chloride; copolymers of vinylidene chloride with acrylonitrile; copolymers of vinylidene chloride with methyl acrylate or ethyl acrylate; and copolymers of vinylidene chloride with methyl methacrylate. While the invention may be practiced with resins containing as little as 28.3% of combined chlorine in the polymer molecule it is preferred to use resins containing at least 48.2% of combined chlorine, in particular, those with from 48.2% to 59.2% of chlorine. A particularly preferred class of resins for the practice of this invention includes polyvinyl chloride, copolymers of vinyl chloride with vinyl acetate, copolymers of vinyl chloride with diethyl maleate, copolymers of vinyl chloride with dibutyl maleate and copolymers of vinyl chloride with vinylidene chloride, in each of which the combined vinyl chloride comprises at least 85% by weight of the copolymer.

The dibenzoyl butane may be incorporated into the resin by the methods commonly used in compounding vinyl resins. In addition to open mill mixing, which may be accomplished at temperatures of 110° C. to 165° C., the materials can be mixed in an internal mixer, such as a Banbury machine, at temperatures of 110° C. to 165° C., or, if desired, the vinyl resin may be dissolved in methyl ethyl ketone or some other suitable solvent, and the dibenzoyl butane added to this solution. When the solvent is removed by evaporation the resin is left intimately mixed with the dibenzoyl butane. Other methods can be used, but the method of incorporation of the dibenzoyl butane is not important so long as the resin is intimately mixed with the dibenzoyl butane.

The practice of the invention is illustrated by the following representative examples:

EXAMPLE I

One hundred parts by weight of "Vinylite VYHH" resin and 50 parts by weight of 1,4-dibenzoyl butane were milled together at 149° C., forming a homogeneous flexible sheet. On standing for some time at room temperature this plastic sheet changed to a white, stiff, very tough solid. On warming, it returned to its soft, flexible, plasticized state. The "Vinylite VYHH" resin used was a commercial resin made by Carbide and Carbon Co. and identified as a copolymer of vinyl chloride with vinyl acetate, containing 87% combined vinyl chloride.

EXAMPLE II

One hundred parts by weight of "Saran F-120" and 50 parts by weight of 1,4-dibenzoyl butane were milled together at 149° C., forming a homogeneous flexible sheet. On standing for some time at room temperature this plastic sheet changed to a white, stiff very tough solid. On warming it returned to its soft, flexible, plasticized state. The "Saran F-120" used was a commercial resin made by the Dow Chemical Co. and identified as a copolymer of vinylidene chloride with acrylonitrile, containing 80% of combined vinylidene chloride.

The advantages of the invention are further illustrated by the following comparative tests.

Samples were prepared according to the following formulas by milling the ingredients together on a two-roll mill at 160° C.

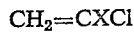

|  | Parts by Weight | |
|---|---|---|
|  | Stock A | Stock B |
| Vinyl chloride-diethyl maleate copolymer (95/5) | 100.0 | 100.0 |
| Dioctyl phthalate | 50.0 | |
| Dibenzoyl butane-1,4 | | 50.0 |
| Stabilizer | 4.0 | 4.0 |
| Stearic acid | 0.5 | 0.5 |
|  | 154.5 | 154.5 |

Test sheets were press-cured 10 minutes at 149° C. and cooled before removing from the mold. The sheets were allowed to stand one week at room temperature before testing the set-up sotck.

Table I

|  | Stock A | Stock B |
|---|---|---|
| 100% Modulus of set-up stock (pounds per square inch) | 1,100 | |
| Tensile of set-up stock (pounds per square inch) | 2,175 | 5,300 |
| Elongation of set-up stock (percent) | 275 | 25 |
| Shore A Hardness of set-up stock | 83 | 97 |
| Shore D Hardness of set-up stock | 41 | 77 |

These data show that the stock plasticized with 1,4-dibenzoyl butane has the hard, rigid, relatively nonextensible properties of an unplasticized stock after standing one week at room temperature. The 100% modulus could not be obtained because the composition could be stretched only 25% before breaking.

The same test sheets were next warmed in an oven and then cooled to room temperature. The following data illustrate the physical properties of the heat-treated stock, the properties of stock A remaining substantially unchanged.

Table II

| | Stock B |
|---|---|
| 100% modulus (pounds per square inch) | 750 |
| Tensile (pounds per square inch) | 3050 |
| Elongation (percent) | 370 |
| Shore hardness, type A | 82 |
| Shore hardness, type D | 43 |
| Specific gravity | 1.3342 |

The rigid stock of Table I after being heated and then cooled to room temperature has practically the same properties as a stock plasticized with dioctyl phthalate. Modulus at 100% elongation, tensile strength, ultimate elongation, and degree of hardness are within the same range as these same properties for the dioctyl phthalate plasticized resin.

Table III

[Change of Olsen stiffness and Shore "A" and "D" hardness of oven-treated stock on standing at room temperature]

Stock B

| | Olsen Stiffness, Inch pounds required to bend a test strip 45° | Shore Hardness | |
|---|---|---|---|
| | | Type A | Type D |
| Original stock | 0.05 | 70 | 31 |
| 2 days | 3.20 | 96 | 65 |
| 4 days | 6.00 | 97 | 69 |
| 6 days | 7.20 | 97 | 72 |
| 8 days | 7.92 | 98 | 75 |
| 10 days | 8.76 | 98 | 75 |
| 12 days | 9.84 | 98 | 76 |
| 14 days | 10.20 | 98 | 76 |
| 16 days | 10.44 | 98 | 76 |

Shore hardness in the above examples was determined according to ASTM method No. D676-49T. This test gives a measure of the relative resistance of a stock to indentation. It is frequently employed in the rubber and plastics industry to give a measure of the relative hardness of rubber and plastic compositions.

Olsen stiffness was determined by ASTM method No. D747-50. This test gives a measure of the resistance of a stock to bending. The higher the test figure, the greater is the resistance of a stock to bending.

From the data disclosed in Table III it is seen that the stock of Table II gradually hardens and stiffens at room temperature. After about fourteen days the composition has again attained the properties of a hard, rigid, unplasticized resin.

A similar stock was made up using diphenyl adipate as the plasticizer. The results were essentially the same as those obtained using 1,4-dibenzoyl butane as the plasticizer. The composition on milling became fused and flexible and on cooling to room temperature retained its softness and flexibility for some time, but gradually set up to a hard rigid stock. For example, the composition after being milled and cooled to room temperature had a Shore D hardness of 25 and Olsen stiffness of 0.05. After eight days at room temperature the stiffness value had increased to 7.06 and at 13 days the stiffness value was 9.7 and Shore D hardness 72. On heating this stock, the Olsen stiffness returned to 0.05 and the Shore D hardness to 25.

From the foregoing examples and general discussion the advantages of this invention are readily apparent. By the methods generally used in the processing of vinyl resins a stock can be compounded using the plasticizer of this invention which, when first compounded, is more or less rubbery and flexible, and is comparable with a stock compounded with a regular liquid plasticizer, such as dioctyl phthalate. The stock will retain these properties for some time, even when cooled to room temperature.

In the course of about fourteen days a stock containing 50 parts of 1,4-dibenzoyl butane or of diphenyl adipate by weight per 100 parts by weight of resin will set to a hard, rigid, apparently unplasticized material. This setting up is not a permanent condition, but the stock can be again made flexible and extensible by heating. This property of delayed setting is particularly advantageous in the manufacture or installation of articles which must be shaped, and which must be rigid under conditions of use, but which cannot be conveniently shaped while hot.

While certain representative embodiments and details have been shown for the purpose of illustrating the invention, it will be apparent to those skilled in this art that various changes and modifications may be made therein without departing from the spirit or scope of the invention.

We claim:

1. A composition comprising a polymerized vinyl resin product formed by the polymerization of an alphachloro substituted ethylene having from one to two alphachloro substituents, said product containing from 28.3% to 70.7% of combined chlorine in the polymer molecule, and 5 to 60 parts by weight of a compound of the general formula

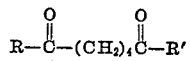

where R and R' are members of the group consisting of phenyl, orthotolyl, metatolyl and paratolyl radicals per 100 parts by weight of said resin.

2. A composition comprising a polymerized vinyl resin product formed by the polymerization of an alphachloro substituted ethylene having from one to two alphachloro substituents, said product containing from 28.3% to 70.7% of combined chlorine in the polymer molecule, and 10 to 50 parts by weight of a compound of the general formula

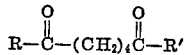

in which R and R' are members of the group consisting of phenyl, orthotolyl, metatolyl and paratolyl radicals per 100 parts by weight of said resin.

3. A composition comprising a polymerized vinyl resin product containing a material selected from the group consisting of vinyl chloride and vinylidene chloride polymerized therein, said product containing from 28.3 to 70.7% of combined chlorine and 5 to 10 parts by weight of a compound of the general formula

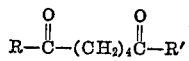

where R and R' are members of the group consisting of phenyl, orthotolyl, metatolyl and paratolyl radicals per 100 parts by weight of said resin.

4. A composition comprising polyvinyl chloride and 5 to 60 parts by weight of 1,4-dibenzoyl butane per 100 parts by weight of said polyvinyl chloride.

5. A composition comprising a polymerized vinyl resin which is a copolymer of vinyl chloride and vinyl acetate, wherein the vinyl chloride comprises at least 85% of the copolymer, and 5 to 60 parts by weight of 1,4-dibenzoyl butane per 100 parts by weight of said resin.

6. A composition comprising a polymerized vinyl resin which is a copolymer of vinyl chloride and diethyl maleate wherein the vinyl chloride comprises at least 85% of the copolymer, and 5 to 60 parts by weight of 1,4-dibenzoyl butane per 100 parts by weight of said resin.

7. A composition comprising a polymerized vinyl resin which is a copolymer of vinylidene chloride and acrylonitrile wherein the vinylidene chloride comprises at least 80% of the copolymer and 5 to 60 parts by weight of 1,4-dibenzoyl butane per 100 parts by weight of said resin.

8. A composition comprising a polymerized vinyl resin which is a copolymer of vinyl chloride and vinylidene chloride wherein the vinyl chloride comprises at least 85% of the copolymer, and 5 to 60 parts by weight of 1,4-dibenzoyl butane per 100 parts by weight of said resin.

9. A composition comprising a polymerized vinyl resin product formed by the polymerization of an alphachloro substituted ethylene having from one to two alphachloro substituents, said product containing from 28.3% to 70.7% of combined chlorine in the polymer molecule, and 5 to 60 parts by weight of 1,4-dibenzoyl butane per 100 parts by weight of said resin.

References Cited in the file of this patent

UNITED STATES PATENTS

| | | |
|---|---|---|
| 2,335,371 | Willis | Nov. 30, 1943 |
| 2,339,387 | Endres | Jan. 18, 1944 |
| 2,342,378 | Smith | Feb. 22, 1944 |

FOREIGN PATENTS

| | | |
|---|---|---|
| 527,408 | Great Britain | Oct. 8, 1940 |